US011128955B1

United States Patent
Li et al.

(10) Patent No.: US 11,128,955 B1
(45) Date of Patent: Sep. 21, 2021

(54) METHOD AND APPARATUS FOR MANAGING AUDIO PROCESSING IN A CONVERGED PORTABLE COMMUNICATION DEVICE

(71) Applicant: MOTOROLA SOLUTIONS, INC., Chicago, IL (US)

(72) Inventors: Haohua Li, Coral Springs, FL (US); Keh Yong Teh, Ayer Itam (MY); Jesus F Corretjer, Weston, FL (US); Lian Kooi Ng, Taiping (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/020,985

(22) Filed: Sep. 15, 2020

(51) Int. Cl.
| | |
|---|---|
| *H04R 3/04* | (2006.01) |
| *H04R 3/02* | (2006.01) |
| *G10L 21/0208* | (2013.01) |
| *G10L 15/08* | (2006.01) |
| *G10L 21/0216* | (2013.01) |

(52) U.S. Cl.
CPC ............... *H04R 3/04* (2013.01); *G10L 15/08* (2013.01); *G10L 21/0208* (2013.01); *H04R 3/02* (2013.01); *G10L 2015/088* (2013.01); *G10L 2021/02082* (2013.01); *G10L 2021/02163* (2013.01)

(58) Field of Classification Search
CPC ....... G10L 21/0208; G10L 2021/02082; G10L 2021/02163; G10L 15/08; G10L 2015/088; H04R 3/02; H04R 3/04
USPC ...................................................... 381/71.1
See application file for complete search history.

(56) References Cited

U.S. PATENT DOCUMENTS

| | | | |
|---|---|---|---|
| 8,843,227 B2 | 9/2014 | Sinai | |
| 10,074,369 B2 | 9/2018 | Devaraj et al. | |
| 2011/0124300 A1 | 5/2011 | Sinai | |
| 2016/0373899 A1* | 12/2016 | Celinski | .................. G06F 3/162 |
| 2018/0190279 A1* | 7/2018 | Anderson | ........... G10L 15/1822 |
| 2020/0075018 A1 | 3/2020 | Chen | |
| 2020/0106872 A1 | 4/2020 | Ondo et al. | |

* cited by examiner

*Primary Examiner* — Paul Kim
(74) *Attorney, Agent, or Firm* — Barbara R. Doutre

(57) ABSTRACT

Improved audio processing management in a portable converged communication device is provided. A default mode of audio processing is provided where audio input to a microphone is routed and processed simultaneously to a plurality of different processors in parallel. The default mode is suspended in response to a keyword input to a microphone. The keyword is recognized by a speech recognition engine (ASR). The keyword enables audio processing through one of the plurality of processors while selectively suspending other audio processing through the other processors.

20 Claims, 6 Drawing Sheets

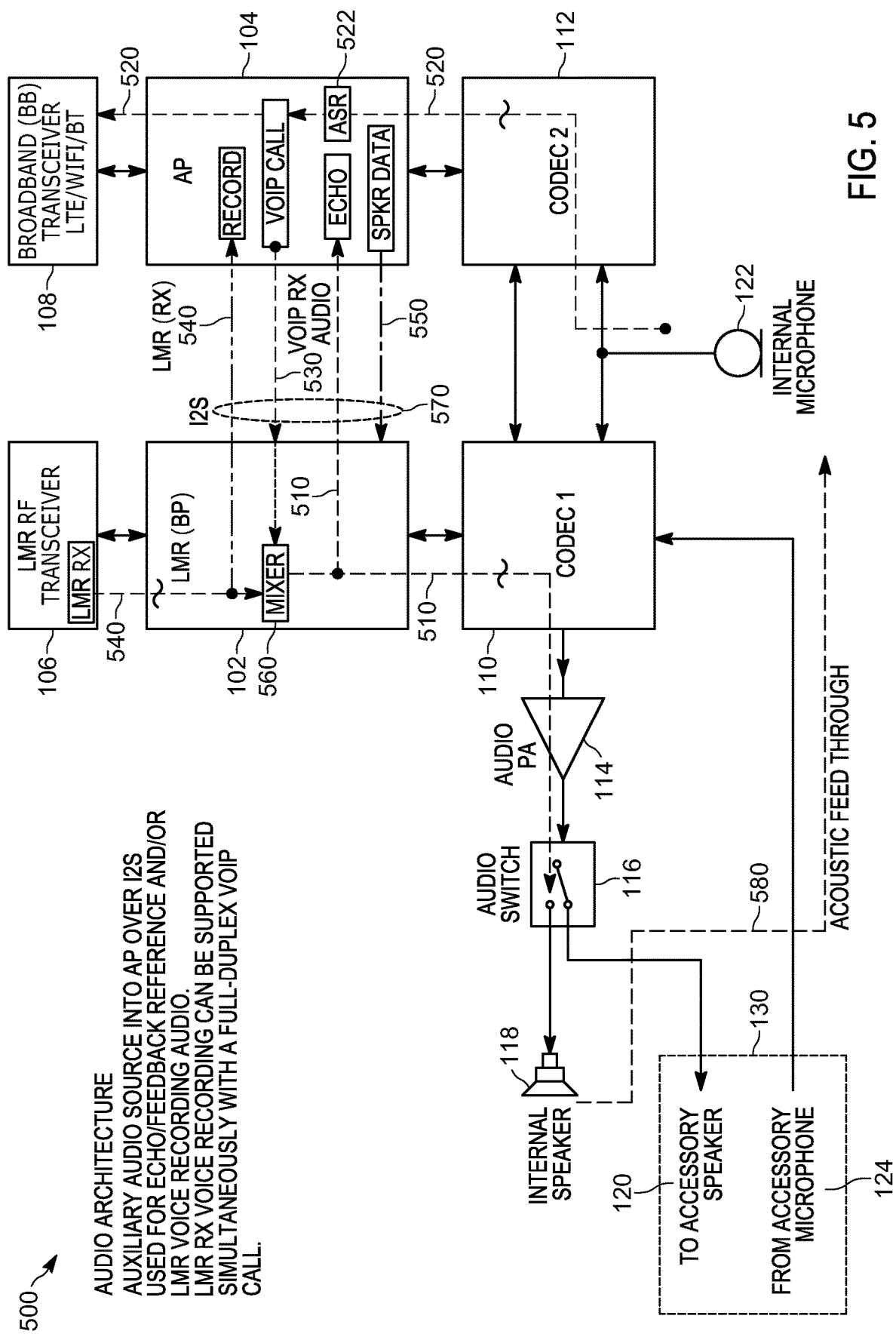

METHOD AND APPARATUS FOR MANAGING AUDIO PROCESSING IN A CONVERGED PORTABLE COMMUNICATION DEVICE

BACKGROUND OF THE INVENTION

Public safety personnel, such as police officers, firefighters, paramedics and the like typically utilize portable communication devices while working in the field. Public safety communication devices may include, for example, handheld radios operating with remote accessories, such as remote speaker microphones, headsets, and the like. Audio processing in a multi-microphone environment can be challenging, particularly in cases where different audio features and audio applications are operating at the same time, such as in the multi-processor environment of a converged communication device. There is a need for improved management of audio processing in a converged portable communication device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 illustrates audio processing in the audio architecture of FIG. 1, according to some embodiments.

Figure 1:
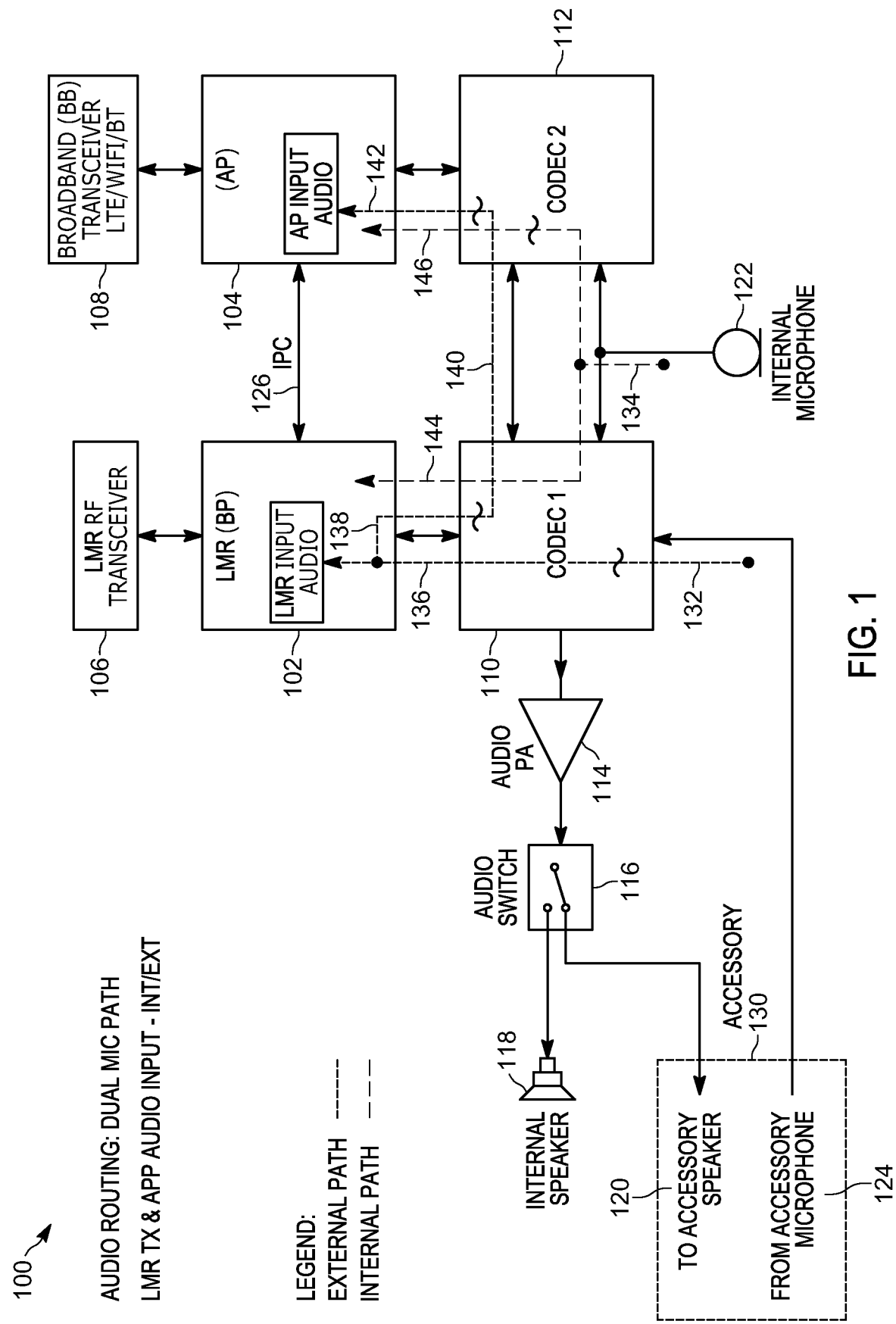
FIG. 1 is a block diagram illustrating an audio architecture and audio processing for a portable communication device and accessory, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein a portable a portable communication device with audio accessory coupled thereto which provide converged functionality via two different processors, two different transceivers, and two codecs, operating within a multi-microphone environment. Parallel microphone sharing in the multi-microphone environment is achieved by the use of a dynamic interface control between the two different processors. The parallel microphone sharing enables efficient co-existence during a converged default mode as well as selectivity of different audio features and applications. Messaging via an interprocessor communications (IPC) interface coordinates events on both processors to enable user selection of audio processing based on keywords spoken by the user.

In accordance with the embodiments provided herein voice keyword detection is used at the beginning of, or during a call, to trigger radio software to determine an appropriate audio path. The type of call intended by the user, spoken as a keyword, routes the audio along the appropriate voice processing path.

Using event coordination between the two processors (an applications processor and a baseband processor) allows more audio applications and features to run concurrently while minimizing interference. The messages allow command and control over each activity on each processor with flexibility to start, stop, and pause different audio related tasks. Pre-selected commands or keyword allow a user to vary their audio focus during interaction with different concurrent audio calls. For example, when a user is having a private or sensitive conversation in a land mobile radio (LMR) group call, and that user does not want to be heard in a concurrent VoIP call, the VoIP call can be suspended via a command message or keyword.

The embodiments further provide for the minimization of interference, such as echo interference, by re-purposing an inter-processor I2S path as an auxiliary audio source between the two processors during concurrent LMR receive audio of a half-duplex call and broadband receive audio of a full duplex call. The I2S path is used to send an echo feedback reference signal from the baseband processor to the applications processor, the echo reference signal being a combination of the LMR receive audio and the broadband receive audio. The inter-processor auxiliary path, I2S, can also be re-used for different audio applications, for example the recording of LMR receive audio by the applications processor.

FIG. 1 is a block diagram illustrating an audio architecture and audio processing in a portable communication device 100 having an audio accessory 130 operatively coupled thereto, according to some embodiments. The portable communication device 100 comprises at least one baseband processor (BP) 102, and at least one applications processor (AP) 104. The baseband processor 102 manages LMR radio frequency (RF) operations via an LMR RF transceiver 106. The applications processor 104 manages broadband frequency operations, such as LTE, WiFi, BLUETOOTH and the like, via a broadband transceiver 108. The baseband processor 102 and the applications processor 104 further manage audio processing via first and second audio codecs 110, 112. The first and second audio codecs 110, 112 provide hardware for encoding analog audio into digital signals and decoding digital signals back into analog signals. In accordance with the embodiments, a first internal microphone 122 is operatively coupled to the first and second codecs 110, 112 in parallel, while an accessory microphone 124 of audio accessory 130 is operatively coupled to the first codec 110 for processing transmit audio.

The architecture of FIG. 1 supports both simplex (half-duplex audio) communications over LMR and full-duplex communications. During an LMR call, incoming LMR RF signals to the portable communication device 100 are processed through the LMR RF transceiver 106, baseband processor 102 and first codec 110 for amplification by an audio power amplifier 114 and routing via an audio switch 116 for playing out audio at an internal speaker 118 or an external accessory speaker 120.

In broadband receive mode, incoming broadband signals (for example LTE, WiFi, or BLUETOOTH signals) are processed through the broadband transceiver 108, applications processor 104, second codec 112, and first codec 110 for amplification by the audio power amplifier 114 and routed via the audio switch 116 for playing out at the internal speaker 118 or the accessory speaker 120.

The architecture of FIG. 1 allows audio input to a microphone (internal microphone 122 or external microphone 124) to be routed and processed by both processors 102, 104 (LMR and App) at the same time, thereby providing for parallel sharing.

When the external accessory microphone 124 is being used, the analog LMR or app audio input 132 is routed to the first codec 110 for conversion of the analog signal to a digital signal 136, which is then transferred to the LMR baseband processor 102 for processing into digital signal 138. The LMR BP 102 forwards the processed digital signal 138 back to the first codec 110 for conversion to an analog signal 140. The analog signal 140 is then sent to the second codec 112 (in series) for conversion to a digital signal 142 which is sent to and processed by the AP 104. In this audio routing arrangement the BP 102 acts as the microphone audio master, whereas the AP 104 operates as the slave.

When the internal microphone 122 is being used, the audio input 134 (app audio or LMR audio) goes to the first and second codecs 110, 112 in parallel, each codec 110, 112 processing the analog input signal into respective app digital signals 144, 146. Each codec 110, 112 transfers the app digital signals 144, 146 to both the BP 102 and the AP 104. The purpose of parallel microphone sharing between the two processors 102, 104 is to allow independent audio processing through both processors as a default mode, unless the user explicitly suspends one of them through a spoken keyword. Only the BP 102 is used to control the speakers, 118, 120 via the first codec 110, which, as discussed in later embodiments will help with echo cancellation.

Hence, the architecture has provided for series and parallel processing of the applications or LMR audio input, depending on which microphone type (internal or external) is being used by the user. This architecture is particularly beneficial as additional LMR audio features are run simultaneously with app audio applications as will be described in the following processing figures.

Figure 2A:
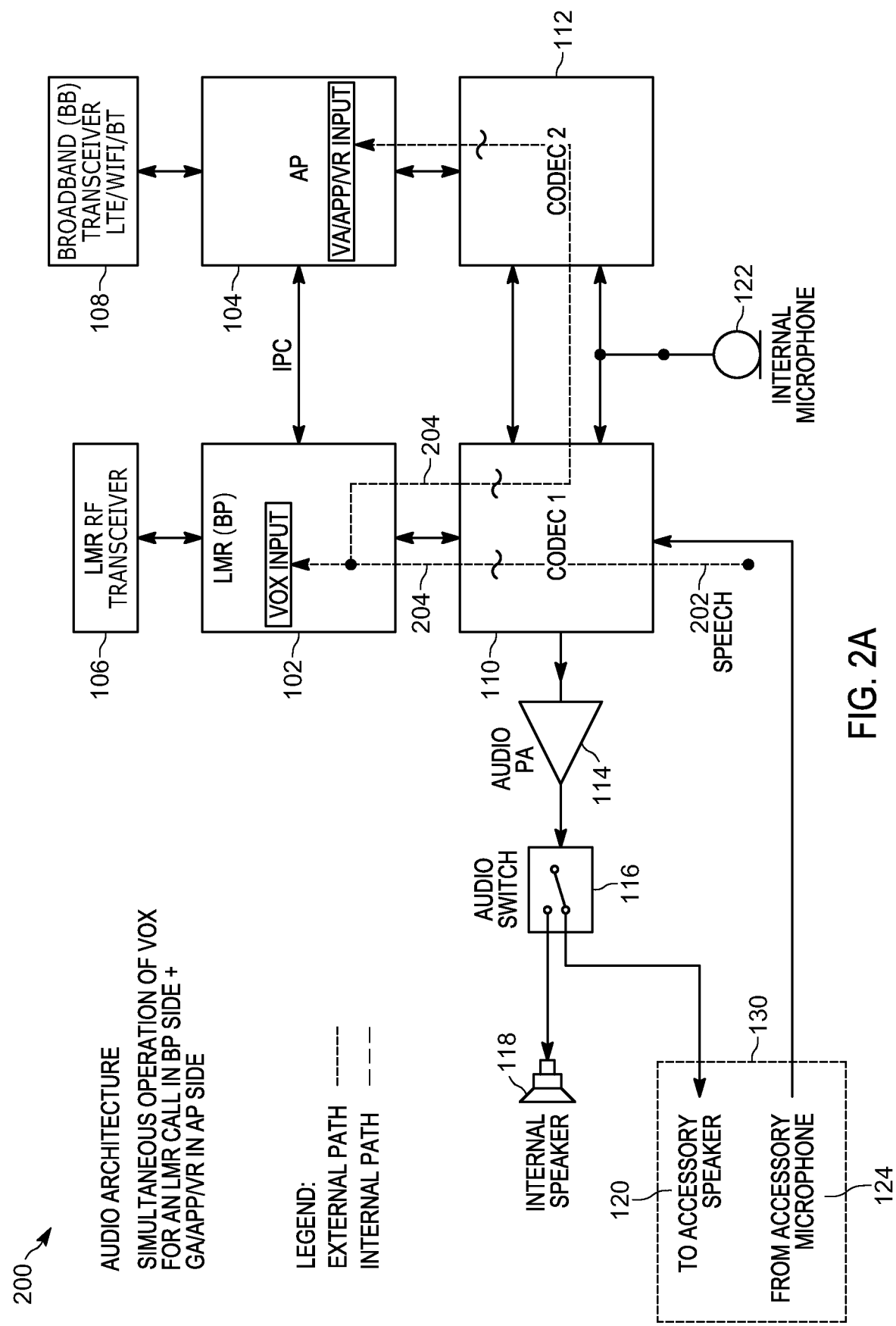
FIGS. 2A and 2B illustrate audio processing in the audio architecture of FIG. 1 in accordance with some embodiments.

FIG. 2A illustrates audio processing in the audio architecture of FIG. 1 in accordance with some embodiments. The architecture providing the parallel microphone sharing approach facilitates certain LMR voice features, such as for example, an LMR voice-operated exchange (VOX) feature being operated in parallel with an AP audio application.

The VOX feature, also referred to as "voice activated transmission", is found in most higher-end consumer two-way radios. Virtually all two-way radios and two-way radio accessories have a push-to-talk (PTT) button, to enable transmitting, With the VOX feature switched on, the microphone is always listening for voice and when the microphone detects voice, it will then automatically start broadcasting. The VOX feature thus facilitates hands free operation by not requiring the PTT to be pressed.

However, the LMR VOX feature transmits all microphone audio with present voice activity which can be challenging when applications input audio is present at one of the device's microphones. In the past, audio intended only for the AP 104 may have been unintentionally transmitted into an LMR talkgroup via VOX (e.g. a virtual assistant audio input being inadvertently transmitted to an LMR talkgroup). In accordance with the embodiments, the parallel microphone sharing approach facilitates the VOX feature being operated in parallel with an AP audio application, however due to the lack of PTT press as an indicator, the parallel processing does also present some challenges which have been addressed.

Operationally, an audio signal 202 is input to the accessory microphone 124 of audio accessory 130 which is processed through first codec 110 and translated to a digital signal 204 for processing by the BP 102. The audio signal 204 is sent as a digital signal to the first codec 110 where, similarly to FIG. 1, the signaling is converted to an analog signal which is then processed in series through the second codec 112 and the AP processor 104. In the VOX embodiment, VOX detects speech activity, and the BP 102 detects the presence of voice, sending an unaffected signal to the AP 104. Note that audio is not reserved for one microphone or the other. The accessory 130 could be used for an app (e.g. WhatsApp). Hence, either microphone can be used. The use of the internal microphone 122 causes parallel path processing, and the use of external microphone 124 causes serial path processing. A keyword is still used under both scenarios. The serial path processing has been shown in FIG. 2A. Parallel path processing is shown in FIG. 2B where audio signal 206 is input to the internal microphone 122 and processed through the first and second codecs and first and second processors 102, 104.

Figure 2B:
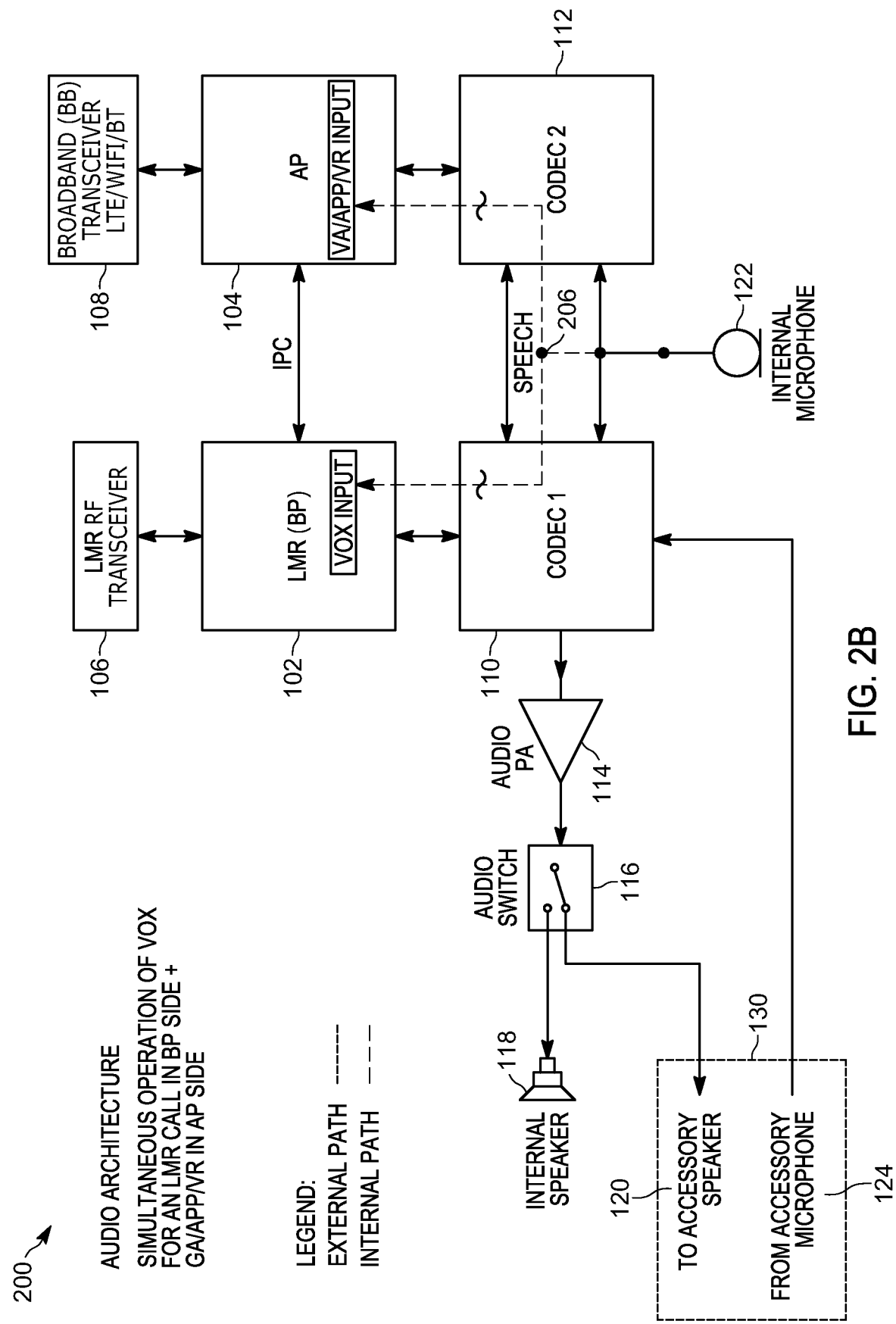

The VOX signaling thus, by default, hits both processors 102, 104—whether having been processed in series as shown in FIG. 2A or in parallel as shown in FIG. 2B. To avoid potentially transmitting over two different paths (via the BP 102 and AP 104) simultaneously, the use of keywords is introduced in accordance with some embodiments. A pre-selected keyword such as "VOX" input by a user to the microphone will trigger the VOX audio processing path and will disable processing of an applications audio input at the AP processor 104. Further description of keyword input is described in conjunction with FIG. 3.

Figure 3:
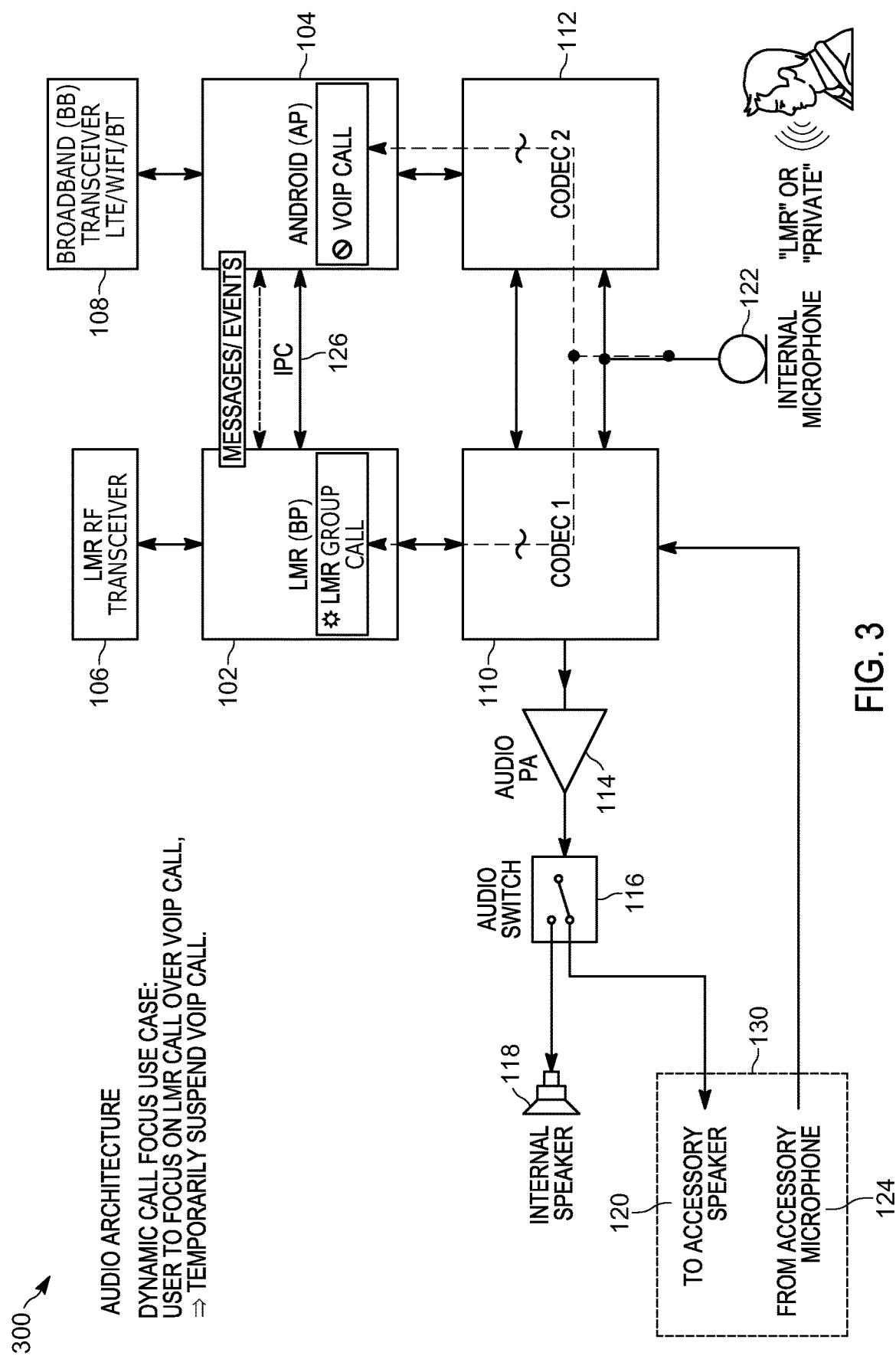
FIG. 3 illustrates the use of a keyword to enable and disable audio processing in the audio architecture of FIG. 1 in accordance with some embodiments.

FIG. 3 illustrates the use of a keyword to enable and disable audio processing in the audio architecture of FIG. 1 in accordance with some embodiments. In accordance some embodiments, an automatic speech recognition (ASR) engine 522 within the AP 104 is used for the detection of pre-selected keywords and triggering of audio routing based on the keywords. The ASR can alternatively be in the BP processor 102, or as another alternative two ASRs, one in each processor, could also be used. In accordance with some embodiments, inter-processor communications controlling audio routing and processing between the BP 102 and AP 104 take place over the inter-process communication (IPC) interface 126 based on the recognized keywords.

The use of keyword detection is provided at the beginning of or during a call (or app usage) to trigger radio software within the AP 104 to determine which voice processing path the user intends to use. For example, a user can say words such as: "private", "LMR" "VOX", or "WhatsApp", to trigger an audio processing path prior to speaking the actual message (or during the message) in order to express user voice intent to control the processor and audio path that become active while other paths are suspended.

Upon detecting the pre-selected keywords in the microphone audio input (either at internal microphone 122 or the external accessory microphone 124), either at the beginning or during the call, the portable communication device can infer the user's intent and use that to temporarily suspend the audio processing through the non-selected processor by communicating the suspension via the IPC interface 126.

If the user does not speak any of the preselected keywords at the beginning or during the call, the device 100 will interpret this as the user wanting concurrent parallel processing of the microphone input through multiple features and applications in the different processors 102, 104—as the default behavior.

In the example of FIG. 3, the preselected word, such as "LMR" or "Private" is input at internal microphone 122. In this example, the entered keyword is routed to both the first and second codecs 110, 112 during a VoIP call which is taking place using the AP 104. Analog to digital signal conversion of the keyword takes place on both paths in parallel at the first and second codecs 110, 112 as previously described. The digital signal received by the AP 104 is recognized, by the ASR 522 contained therein, as a BP user intended LMR or private call, and the AP 104 suspends the VoIP call within the AP 104. The IPC 126 notifies the LMR baseband processor 102 of the LMR group call user selection. The LMR group call then takes place and is processed over the LMR BP 102.

While the ASR engine 522 is described as being in the AP processor 104, it is appreciated that the ASR engine could be in one or both processors 102, 104. By not having the ASR on the BP 102, the BP becomes the default processing operation triggered by preselected BP type keywords, such as LMR, private, VOX, or other LMR type audio feature.

If the ASR remains on the AP 104 and preselected words are directed to AP applications, such as "WhatsApp" or some other preselected keywords, the AP can control the audio processing by suspending the BP processor 102 via the IPC 126. Hence, audio routing is able to remain intact, (audio still present at the input to both processors), and just the processing of that audio has changed. Audio signals are permitted to be present at the inputs to both processors but only one processor will respond while the other is suspended.

Figure 4:
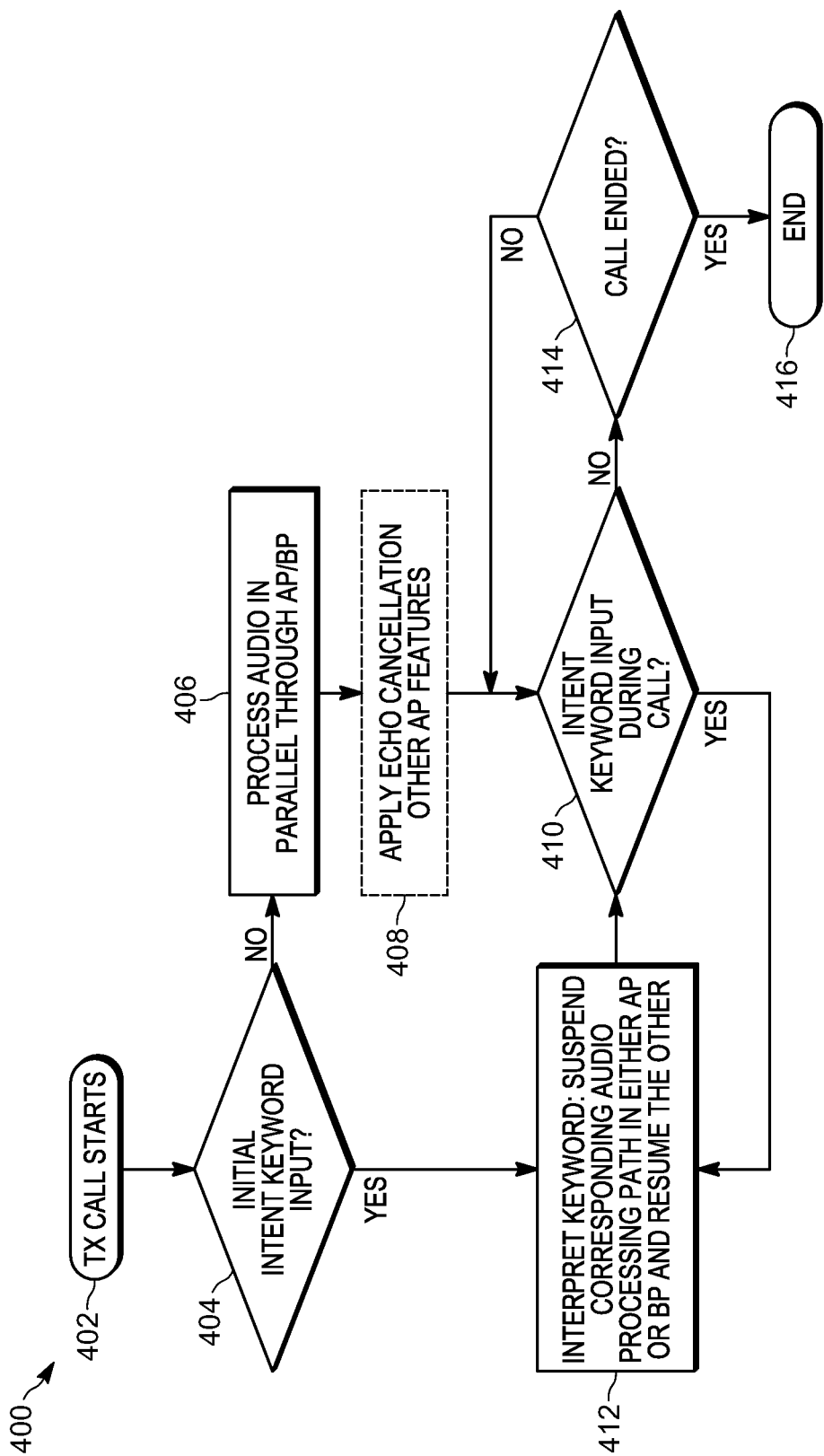
FIG. 4 is a flowchart illustrating a method for managing audio processing, according to some embodiments.

FIG. 4 is a flowchart of a method 400 for managing audio processing in a portable converged communication device, such as the portable communication device and accessory of FIG. 1, in accordance with the embodiments. The method begins by starting to transmit a call at 402. The call may be started via a PTT press for LMR audio or switch-enabled without a PTT press for LMR VOX, and/or enabled for an AP-controlled audio application such as VoIP call, a video recording (VR) call, a virtual assistant (VA); and/or a voice control (VC) session.

The microphone input may be may input to an internal microphone of the portable communication device and/or an external microphone associated with the audio accessory coupled to the portable communication device. At 404, keyword recognition monitoring takes place to determine if a preselected keyword has been input to a microphone (internal microphone or external microphone). If no keyword is detected at 404, the method goes into a default mode at 406 where parallel processing of audio takes place through two different processors, the BP 102 and the AP 104 of the previous figures.

Depending on the audio applications and audio features being run at 406, echo cancellation and/or additional audio applications may additionally be run at 408. For example echo cancellation can be applied by the AP to improve audio processing of parallel AP audio and BP audio being played out of a speaker. Voice recording of LMR receive audio can be also recorded by the AP. Certain features such as voice recording can take place simultaneously with the echo cancellation. A user may choose to send voice to two destinations simultaneously, if desired. For example, a user may want the LMR audio to simultaneously reach an LMR talkgroup and a VoIP call recipient (e.g. Skype user). As another example, a user may want to simultaneously transmit LMR voice in parallel through WiFi/LTE for diagnostic purposes. As another example, an LMR talk group can take place while the talkgroup call is sent to the cloud for analytics. Echo cancellation can take place in parallel with these as well as other audio features being processed.

If a preselected keyword is input to one of the microphones during the default mode of parallel audio processing at 406, then the corresponding audio processing is suspended and the audio input to the microphone is processed through the non-suspended processing path at 412. The audio processing is responsive to the keyword at any time during the default mode. Continued monitoring for preselected keywords takes place at 410 until the call ends at 414 and audio processing ends at 416.

If at 404, a preselected keyword is input to one of the microphones at the beginning of transmit, then corresponding audio processing associated with the non-selected processing is suspended, and the audio input to the microphone is processed through the non-suspended processing path at 412. Continuous keyword monitoring takes place at 410 until the call ends at 414 and audio processing ends at 416. Hence, keyword monitoring takes place consciously and can be detected at the beginning or during the audio processing.

The method 400 can be summarized as a method for managing audio processing in a portable converged communication device by operating in a default mode of audio processing where audio input to a microphone is routed and processed simultaneously to a plurality of different processors, and suspending the default mode of audio processing in response to a keyword input to a microphone, the keyword being recognized by a speech recognition engine (ASR), the keyword enabling audio processing through one of the plurality of different processors while selectively suspending other audio processing through the plurality of different processors.

The audio processing is responsive to the keyword at any time during the default mode. The method may dynamically adjust audio processing sampling rates based on the predetermined keyword. The plurality of different processors may comprise a baseband (BP) and an applications processor (AP). The plurality of different processors may selectively manage simplex audio communications and full duplex audio communications. The simplex audio communications may be managed by the BP and the full duplex audio communications may be managed by an AP. An example of suspended operations may be the BP performing an LMR voice call while the AP suspends broadband audio applications. The BP audio processing may be suspended in response to a keyword associated with AP audio processing, and AP audio processing may be suspended in response to a keyword associated with BP audio processing. The predetermined keyword may be selected to enable mission critical simplex audio communications through the baseband processor, while other BP managed audio applications continue to operate simultaneously, while all other AP managed audio applications managed by the AP are suspended.

FIG. 5 illustrates audio processing in the audio architecture of FIG. 1, according to some embodiments. In this embodiment, the communication device 100 is engaged in a VoIP full duplex call, while simultaneously receiving an LMR call on a different talk group. While the ability to simultaneously provide both a full-duplex call while receiving an LMR call is a highly desirable feature of communication device 100, challenges associated with echo may arise when the speaker 118 is playing out VoIP receive audio of the duplex call while also playing out LMR receive audio. It is desirable to avoid echo which can potentially be picked by the internal microphone 122 via an acoustic feed through path 580 from speaker 118.

The audio architecture of the embodiments provides improved echo cancellation to address the potential acoustic feed through 580. In accordance with the embodiment, the BP 102 provides a mixed signal 510 as an echo reference signal to the AP 104. Mixed signal 510 is a mixed audio signal comprising broadband receive audio, in this case VoIP receive audio 530, of a full duplex call mixed with LMR receive audio 540.

In accordance with this embodiment, an I2S bus 570 is utilized between the BP 102 and the AP 104 to control the transfer of the various receive audio signals (LMR receive 540, VoIP receive 530, mixed signal 510, and speaker data 550). The I2S bus 570, while typically used as a stereo bus (left and right channels), has been repurposed as an auxiliary audio path for the various signal transfers and echo cancellation. The architecture and use of I2S bus 570 allows for various audio applications to be run in parallel by the AP 104. For example, LMR receive audio 540 can be recorded by the AP 104, while echo cancellation takes place within the AP 104. Speaker priority data can be conveyed from the AP 104 to the BP 102 while VoIP receive audio 530 is sent from the AP 104 to the BP 102.

Operationally, while the communication device 100 is engaged in a VoIP full duplex call while simultaneously receiving an LMR call on a different talk group, the microphone input audio 520 of the full duplex call is encoded into a digital signal at second codec 112 and sent to AP 104 for processing and transmission over the broadband transceiver 108, such as over LTE, WIFI, or BT modem.

The VoIP receive audio 530 is sent over I2S bus 570 to the BP 102 for mixing with the LMR receive audio 540 at mixer 560 of the BP 102. The mixed signal 510, which is a combination of VoIP receive audio and LMR receive audio is processed by the first codec 110 for conversion back to an analog signal which is forwarded through the speaker path and played out at speaker 118.

The mixed signal 510 is also transferred over the I2S bus 570 from the BP 104 as an echo reference signal to the AP 104. Improved echo cancellation is achieved using adaptive digital signal processing in the AP 104 that subtracts the echo reference signal 510 from the microphone input signal 520 using predetermined time alignment and delays, under the control of the AP 104.

Accordingly, there has been provided a microphone processing approach for a converged communication device that does not rely or require dedicated independent microphone paths. The use of continuous keyword monitoring to control microphone audio routing allows the user's intent to control transmit audio processing. The continuous voice keyword recognition between concurrently running apps as part of a regular voice call microphone audio is beneficially convenient and efficient from a user standpoint, in that it negates the need for any button pressing or other user interface steps. The approach advantageously prevents, for example, AP audio applications from being transmitted into an LMR talk group via VOX. The approach is particularly beneficial to multi-processor converged communication devices by allowing the user to control the audio processing independently on each processor via spoken pre-selected keywords. The focus of the keyword being on the microphone/transmit side allows the user to have more control over audio in a converged device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a . . . ", "has a . . . ", "includes a . . . ", "contains a . . . " does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for managing audio processing in a portable converged communication device, the method comprising:
   operating in a default mode of audio processing where audio input to a microphone is routed and processed simultaneously to a plurality of different processors; and
   suspending the default mode of audio processing in response to a keyword input to the microphone, the keyword being recognized by a speech recognition engine (ASR), the keyword enabling audio processing through one of the plurality of different processors while selectively suspending other audio processing through the plurality of different processors.

2. The method of claim 1, where the audio processing is responsive to the keyword at any time during the default mode.

3. The method of claim 1, wherein the plurality of different processors comprises a baseband processor (BP) and an applications processor (AP).

4. The method of claim 3, wherein the BP performs an LMR voice call while the AP suspends broadband audio applications in response to a keyword.

5. The method of claim 3, wherein simplex audio communications are managed by the BP and full duplex audio communications are managed by the AP.

6. The method of claim 3, wherein:
   BP audio processing is suspended in response to a keyword associated with AP audio processing; and
   AP audio processing is suspended in response to a keyword associated with BP audio processing.

7. The method of claim 3, wherein during the default mode the BP further receives LMR voice receive audio while the AP simultaneously processes broadband receive audio, thereby playing out a combination of LMR receive audio and broadband receive audio at the speaker.

8. The method of claim 3, wherein the predetermined keyword enables mission critical simplex audio communications through the BP, while other BP managed audio applications continue to operate simultaneously, while all other AP managed audio applications managed by the AP are suspended.

9. The method of claim 3, further comprising;
   transferring BP receive audio over a first channel of an I2S bus from the BP to the AP;
   transferring an echo reference signal formed of BP receive audio mixed with AP receive audio over a second channel of the I2S bus from the BP to the AP; and
   recording the BP receive audio at the AP while applying echo cancellation at the AP.

10. The method of claim 3, further comprising:
    transferring LMR receive audio over an I2S bus from the BP to the AP; and
    recording the LMR receive audio by the AP while simultaneously playing out a combination of LMR receive audio and broadband receive audio at the speaker.

11. The method of claim 10, further comprising:
    transferring the combined LMR receive audio with broadband receive audio from the BP to the AP as an echo reference signal; and
    applying the echo reference signal to acoustic feed through picked up by the first internal microphone from the speaker, thereby cancelling echo to the combination of LMR receive audio and broadband receive audio.

12. The method of claim 1, further comprising:
    dynamically adjusting audio processing sampling rates based on the predetermined keyword.

13. The method of claim 1, wherein the microphone audio input is received by one of:
    an internal microphone of the portable radio; and
    an external microphone associated with an audio accessory coupled to the portable radio.

14. The method of claim 1, wherein during the default mode the broadband receive audio originates from at least one of:
    a VoIP call;
    a video recording (VR);
    a virtual assistant (VA); and
    a voice control (VC) session.

15. A portable communication device, comprising:
    a land mobile radio (LMR) transceiver operatively managed by an LMR baseband processor (BP);
    a broadband transceiver operatively managed by an applications processor (AP);
    a serial bus interface operatively coupling the BP and the AP;
    a first CODEC operatively coupled to the LMR BP;
    a second CODEC operatively coupled to the AP;
    a first microphone coupled within the portable communication device and operatively coupled to the first and second CODECS in parallel;
    a second microphone coupled to the first CODEC via an external accessory;
    an automatic speech recognition (ASR) engine operating within the second CODEC with functionality shared between the AP and BP and operatively coupled to a microphone; and
    the ASR engine being configured to recognize a keyword throughout any audio communications, the keyword selectively enabling and suspending audio processing in the AP and BP processors.

16. The portable communication device of claim 15, further comprising:
   an I2S serial bus for transferring digitized LMR receive audio from the LMR BP to the AP for LMR voice recording by the AP.

17. The portable communication device of claim 16, wherein the LMR receive voice recording is supported simultaneously with a full-duplex VoIP call.

18. The portable communication device of claim 15, wherein a full duplex call is processed simultaneously with an LMR receive call, thereby generating simultaneous play out of LMR receive audio and VoIP receive audio at a speaker of the portable communication device.

19. The portable communication device of claim 18, further comprising:
   an I2S serial bus for transferring the VoIP receive audio generated during the full duplex call from the AP to the BP for mixing with an LMR receive audio signal within the LMR BP to generate a mixed signal, the mixed signal being processed through the first codec and played out at the speaker.

20. The portable communication device of claim 19, wherein the mixed signal is also transferred via the I2S serial bus from the BP to the AP as an echo reference signal; and
   acoustic feed through from the speaker to the microphone within the portable communication device is cancelled via the echo reference signal within the AP.

* * * * *